United States Patent [19]

Rothwell

[11] Patent Number: 5,407,571
[45] Date of Patent: Apr. 18, 1995

[54] FILTER UNIT AND MODULAR FILTER ASSEMBLY

[75] Inventor: Charles N. Rothwell, Halifax, Great Britain

[73] Assignee: Pall Corporation, Glen Cove, N.Y.

[21] Appl. No.: 174,178

[22] Filed: Dec. 29, 1993

Related U.S. Application Data

[63] Continuation of Ser. No. 869,439, Apr. 16, 1992, abandoned.

[30] Foreign Application Priority Data

Apr. 19, 1991 [GB] United Kingdom ............... 9108446

[51] Int. Cl.⁶ ............................................. B01D 27/08
[52] U.S. Cl. ................................. 210/232; 210/252; 210/253; 210/444
[58] Field of Search ............... 210/232, 239, 240, 252, 210/253, 322, 323.1, 335, 340, 440, 443, 444

[56] References Cited

U.S. PATENT DOCUMENTS

| | | | |
|---|---|---|---|
| 4,334,995 | 6/1982 | Mahon | 210/340 |
| 4,347,136 | 8/1982 | Friesen et al. | 210/253 |
| 4,637,874 | 1/1987 | Ansteth | 210/232 |
| 4,944,875 | 7/1990 | Gaignet | 210/253 |

FOREIGN PATENT DOCUMENTS

| | | |
|---|---|---|
| 2361139 | 8/1977 | France . |
| 1134659 | 7/1959 | Germany . |
| 1415281 | 6/1971 | United Kingdom . |
| 1586802 | 8/1977 | United Kingdom . |
| 1595846 | 4/1978 | United Kingdom . |

*Primary Examiner*—Matthew O. Savage
*Attorney, Agent, or Firm*—Leydig, Voit & Mayer

[57] ABSTRACT

A filter unit for a modular filter assembly comprises a head (1), said head having a feed chamber (2) and a discharge chamber (3), and a casing (6) surrounding a filter element (4). Fluid flow from the feed chamber to the discharge chamber of said filter unit passes through said filter element. The head (1) is provided with a first inlet opening (21) and a first outlet opening (22) which communicate with said feed chamber (2), and the head (1) is provided with a second inlet opening (31) and a second outlet opening (32) which communicate with said discharge chamber (3).

20 Claims, 10 Drawing Sheets

FILTER UNIT AND MODULAR FILTER ASSEMBLY

This disclosure is a continuation of application Serial No. 07/869,439, filed Apr. 16, 1992 now abandoned.

The invention relates to a filter unit and a modular filter assembly comprising filter units, each unit having a filter head and bowl, which together enclose a filter element. Such filter assemblies are used in industry to filter solutions containing many types of particulate matter, solvents, chemicals, emulsions, paints and the like.

There is an increasing demand in industry for filter systems which can be adapted to several applications, for example systems which can be assembled in modular form to provide the required filter area and/or capacity depending on the particular filter problem. Disposable filter systems are also required for applications where contact with the filter solution is to be minimized. Such systems should also need minimal maintenance and have low replacement costs.

Filter units of the art are frequently provided with metal casings to support and encase disposable filter elements. In some systems, a plastic encasing is provided to contain the influent fluid within the metal support casing. Such systems may have a plenum chamber and a large bowl to contain the various filter elements. As a result, they generally have a large hold-up volume. In addition, such systems may require cleaning, which necessitates down-time when changing the filter elements.

It would therefore also be desirable to have a disposable filter system with smaller hold-up volume, for which this filter changing can be performed quickly and without cleaning time being added to the time needed to change the filter.

The object of the present invention is then to provide a filter unit and a modular filter assembly which are easy to assemble, can be varied in size, are efficient in operation and require minimal replacement time and expense. The assembly should also be producible with simple tools at low cost.

In accordance with the present invention a filter unit and a modular filter assembly are provided as defined in the claims. The filter unit comprises a filter head with a feed chamber and a discharge chamber incorporated therein. A filter element is connected to the filter head and surrounded by a casing or bowl. When flowing from the feed chamber to the discharge chamber, the medium to be filtered must be passed through the filter element. The feed chamber is provided with a first inlet opening and a first outlet opening arranged in the head. Similarly, the discharge chamber is provided with a second inlet opening and a second outlet opening. With this arrangement of feed and discharge chambers having both inlets and outlets, multi-stage assemblies of the filter units can be made in either series or parallel connection or both in combination.

In a preferred embodiment, the feed and discharge chambers or channels are formed as elongated channels and the inlets and outlets of the channels are as arranged on opposing sides of the head. This reduces the length of the fluid passages involved as well as the pressure drop. In a further embodiment, the inlets and outlets of the respective chambers open to mounting surfaces or mounting areas which are preferably each in a plane. These surfaces can be joined by welding, thereby reducing the number of connections or eliminating connection elements and thus enhancing the efficiency of the entire system. The mounting surfaces are arranged so that the filter units are juxtaposed for connection and can be readily connected, preferably by welding, snap on, or adhesive connections with or without an intermediate connection piece.

According to the present invention, a modular filter assembly is provided in which filter units of the above-defined type are connected to one another at their mounting surfaces.

In one embodiment, the mounting surface for the inlet openings and the outlet openings to the feed and discharge chambers respectively are arranged on one surface of the filter head. In another embodiment a first mounting surface for the inlet openings and a second mounting surface for the outlet openings to the chambers are arranged on opposing sides of the filter head. In a further embodiment when the filter heads are formed of plastic material, the respective heads can be conveniently joined at the mounting surfaces for example by welding.

This eliminates the necessity of sealing and fastening means which would require significant assembly time.

In a further embodiment, an assembly is formed of a plurality of filter heads with accompanying filter elements to define a row. The first head in the row is connected to an inlet connector having an inlet passage and a blanking cap integrally formed therewith, which closes the discharge chamber on the inlet side of the filter head. The last filter head in such a row is connected to an outlet connector, where again the outlet connector has an outlet passage and is integrally formed with a blanking cap which closes the feed chamber port on the last filter head.

This integral construction of the inlet and outlet connectors with the blanking caps reduces the number of parts of the system and therefore production costs, assembly time and expense. Furthermore, the ability to connect an arbitrary number of filter units provides flexibility to the system and maximum efficiency inasmuch as the filter capacity can be easily adapted to the filtration problem.

In a further embodiment of the invention, the filter heads, connectors and filter bowls or casings are formed of plastic, preferably thermoplastic, material. Such parts can be readily welded together to form tight joins without the need of additional seals and connecting means. Another advantage is that relatively inexpensive plastic materials can be used which are readily disposable. Thus, when the filter system no longer achieves the specified filter capacity, the entire filter assembly can be disposed of. The necessity for cleaning distribution channels, connectors, etc., is then eliminated from the time required for maintenance work. In other words, when the filter system is no longer effective or the pressure difference is greater than a prescribed limit, the entire system can be changed out instead of the previous practice of changing only the filter element and cleaning the other parts of the assembly.

The invention may be put into practice in various ways and a number of specific embodiments will be described by way of example to illustrate the invention with reference to the accompanying drawings in which.

Figure 1:
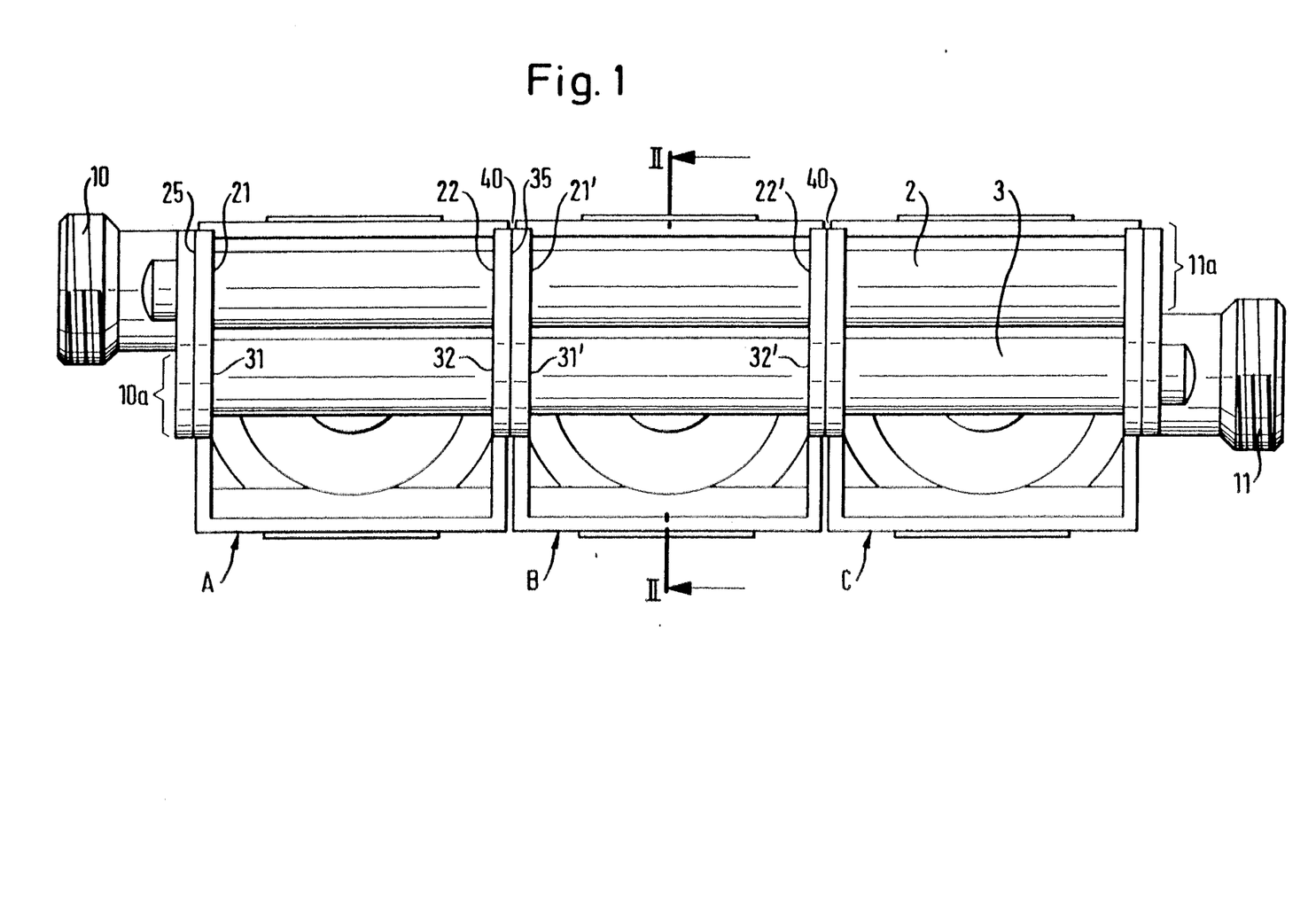
FIG. 1 is a schematic plan view of an assembly with three filter units.

The basic unit of the invention has a head 1 having a feed chamber 2 (here oval in cross-section, see FIG. 2) running from one side to the other and emerging out of the ends 25 and 35 as openings 21 and 22, 21 may be thought of as an inlet as opening and 22 as an outlet opening. The head also has a discharge chamber 3 similarly running through the block preferably parallel to the chamber 2 and also emerging through the ends 25 and 35 as openings 31 and 32, which similarly can be thought of as inlet 31 and outlet 32 openings.

The head has emerging from its rear face a filter housing 6 and filter element 4. These are shown as being cylindrical but other shapes could be used. The chamber 2 has an outlet passage 19 leading out to the outside of the cylindrical filter element 4 (see FIG. 2). The chamber 3 has a spigot 5 (see FIG. 2) on which the filter element can be mounted and by which the interior of the filter element communicates with the discharge chamber 3. The filter element can be enclosed in a cylindrical casing 6 secured to the head 1 by a weld 7 and closed at its remote end by a cap 8.

This is the basic unit of the invention. It can be used on its own or made up into arrays as shown in the drawings, eg., a parallel array of three units (A, B and c) in FIGS. 1 to 3 and a similar array followed by 2 units (D and E) in series in FIG. 4.

The units can be connected together at the planes or faces 25 and 35. In another embodiment described below the openings 22 and 32 are brought round to lie in the same plane as the openings 21 and 31, i.e. the planes 25 and 35 are brought into a single plane. The planes 25 and 35 do not have to be parallel or coplanar but these are the most convenient orientations.

End plates affording connectors 10 and 11 can also be provided and these are described below. They are used to provide inlet connections at the plane 25 and outlet connections at the plane 35. They are described in more detail below and are shown in FIGS. 1, 2, 3 and 4.

Figure 2:
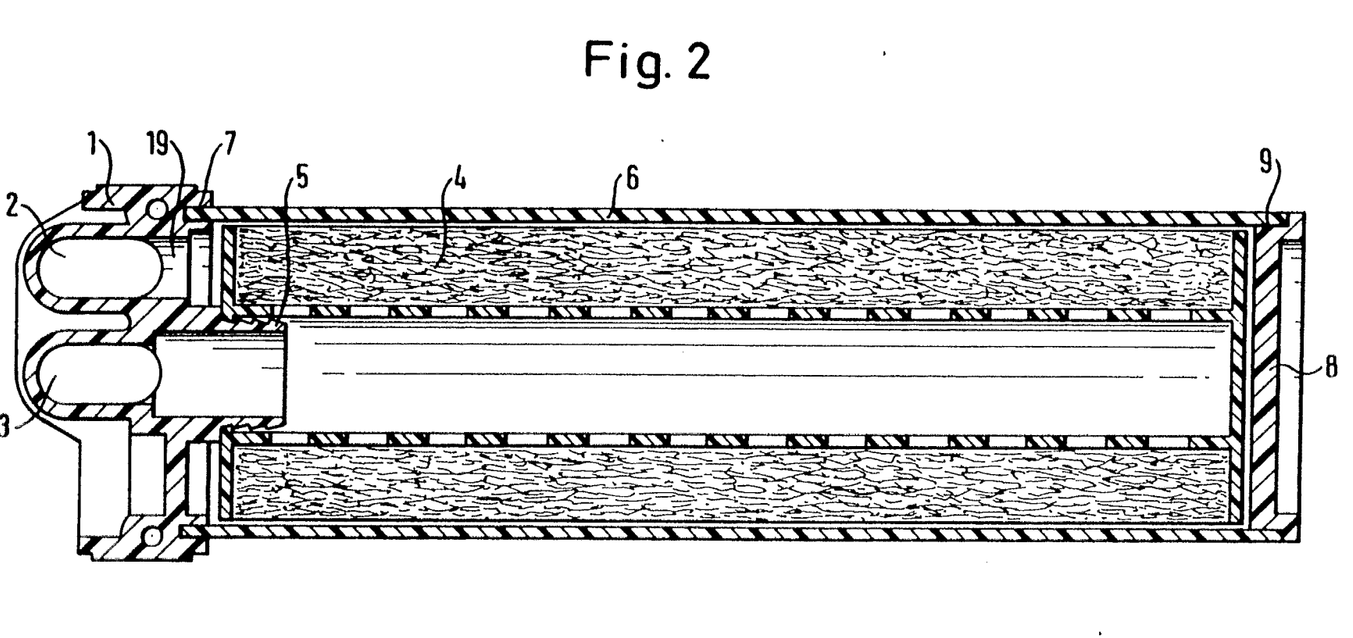
FIG. 2 is a section along line Z—Z of FIG. 1.
Figure 4:
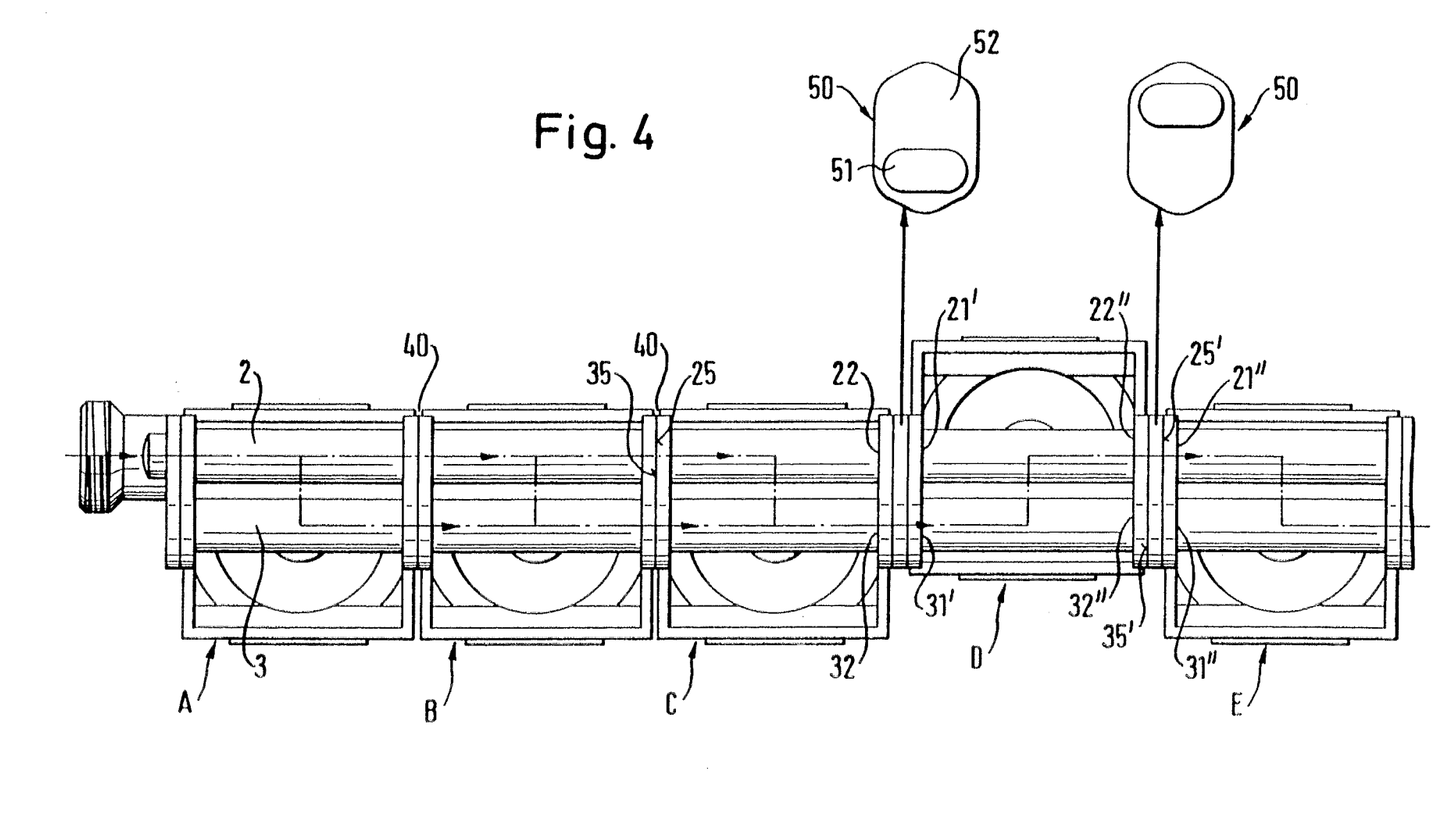
FIG. 4 is a schematic plan view of a further embodiment of the present modular filter assembly.

In FIG. 1, an assembly is shown with three filter units A, B and C connected in a row. (Such an array is also shown in FIG. 4 with the flow paths indicated.) Each filter unit comprises a filter head 1, a feed chamber 2 and a discharge chamber 3 which cain be seen in cross-section in FIG. 2. Also seen in FIG. 2 is a filter element 4, preferably an elongated filter element, which is fitted over a spigot 5 in the filter head. Each filter unit or housing further comprises a tube or casing 6 which forms the body of the filter unit. A closed end cap 8 as seen in FIG. 2 is also connected to the end of the filter casing opposing the filter head. The filter head 1, the filter casing or bowl 6 and the end cap 8 of the filter unit are preferably formed of plastic material.

Thermoplastic material is particularly preferred as it can be readily molded in conventional molding techniques such as extrusion and injection molding. Preferred plastics include polypropylene and polyethylene which are inexpensive, highly versatile and disposable in an ecologically acceptable manner. For applications involving solvents, a polyamide material is preferred.

The end cap 8 when made of plastic can be conveniently welded to the filter bowl 6 which is also made of plastic. In addition, the bowl or casing 6 is welded to the filter head 1 to form a liquid-tight connection without the use of seals or other fastening means.

The individual filter units may be fitted with longer or shorter filter elements to provide flexibility in the filter capacity. Convenient lengths are 10", 20", 30" and 40" (25.4, 50.8, 76.2 and 101.6 cm) with diameters of 2½ or 2¾ inch (6.45 or 7.0 cm). The filter elements of the present invention can also be arranged in parallel or series connection. This provides even further flexibility in the range of sizes of modular assemblies formed of such units. The filter assembly of the present invention will be discussed further below.

Figure 7:
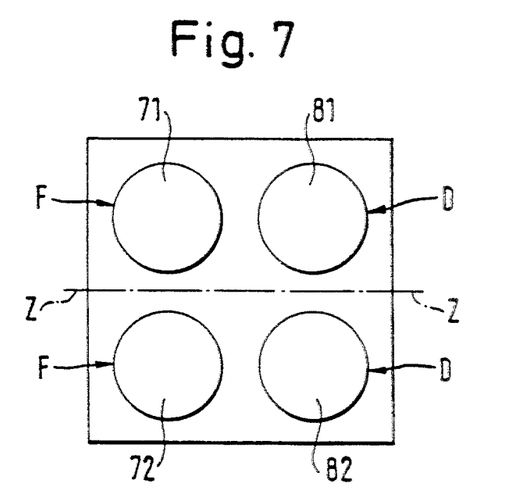
FIG. 7 shows a plan view of an embodiment of the filter unit, where inlet and outlet openings to the feed and discharge chambers are located on the top side of the filter head.

The feed 2 and discharge 3 chambers are arranged integrally in the filter head. The feed chamber 2 in the embodiment shown in FIG. 1 is provided with a first inlet opening 21 and a first outlet opening 22 which communicate with the inlet or feed chamber 2. Correspondingly, the discharge chamber 3 in the embodiment of FIG. 1 is provided with a second inlet opening 31 and a second outlet opening 32. In the embodiment of FIGS. 1 and 2, the inlet openings 21, 31 of the feed and discharge chambers 2, 3 respectively open to a first mounting surface 25 of the head and the outlet openings 31, 32 of the chambers respectively open to a second mounting surface 35. The first and second mounting surfaces 25, 35 of this embodiment are arranged on opposing sides of the filter head. The two mounting surfaces 25, 35 with their associated inlet and outlet openings however can also be arranged on one side of the filter head, for example on the top side of the filter head (FIG. 7). The first and second mounting surfaces 25, 35 allow contact area for joining two or more heads in an assembly as shown for example in FIG. 1.

The filter heads in a preferred embodiment are integrally formed of plastic material which allows simple joining of the heads to form the multi-unit assembly of the present invention. The heads are preferably joined in a welding process, for example platen welding or non-contact melt bonding. Alternatively, an adhesive bonding process can be employed. The mounting surfaces to be joined by welding or bonding can also be ring-like projections around the inlet or outlet holes such as short tubes, a ring of plastic material on the hole periphery, etc.. The mounting surfaces in this case are the outer surfaces of these projections which are abutted in the welding process.

When the filter units comprise plastic material, the entire assembly becomes a readily disposable filter system.

The feed and discharge channels 2, 3 in the embodiment shown in FIG. 1 are provided as elongated channels arranged parallel to one another. Other shapes of the feed and discharge channels are possible depending on the arrangement of the mounting surfaces. The filter head 1 preferably has a rectangular or square shape as shown in FIG. 1. With the feed and discharge channels arranged in parallel and the first and second mounting surfaces arranged on opposing sides of the head. This construction allows simple assembly of the plurality of filter heads to form a modular assembly. The respective inlet openings 21, 31 and outlet openings 22, 32 of the feed and discharge channels then communicate with one another to form combined distribution and connection channels.

It may be noted additionally (see FIG. 5) that fluid entering the feed channel at the opening 21 (see FIGS. 1 and 2) can take two paths. One path for the fluid is to enter into the filter bowl 6, pass from there through the filter element 4 and then into the discharge channel 3 from which it goes to the outlet opening 32. The other path is simply to bypass the filter element and travel directly to the outlet opening 22 of the respective feed channel 2. This arrangement allows for a parallel connection of the filter units when desired.

The discharge or collection channel 3 will have a fluid input coming from the inlet opening 31 and fluid entering from the interior of the filter element. The two fluid as flows are collected and discharged through the outlet opening 32.

According to this embodiment the fluid to be filtered flows from an outside surface of the filter element to the interior thereof. The fluid flow could however be provided in another embodiment where the fluid enters into the interior region of the filter element and flows outwardly to the outside surface. In this case the feed channel (2) and discharge channel (3) would take on the reversed or interchanged functions, respectively.

Figure 5:
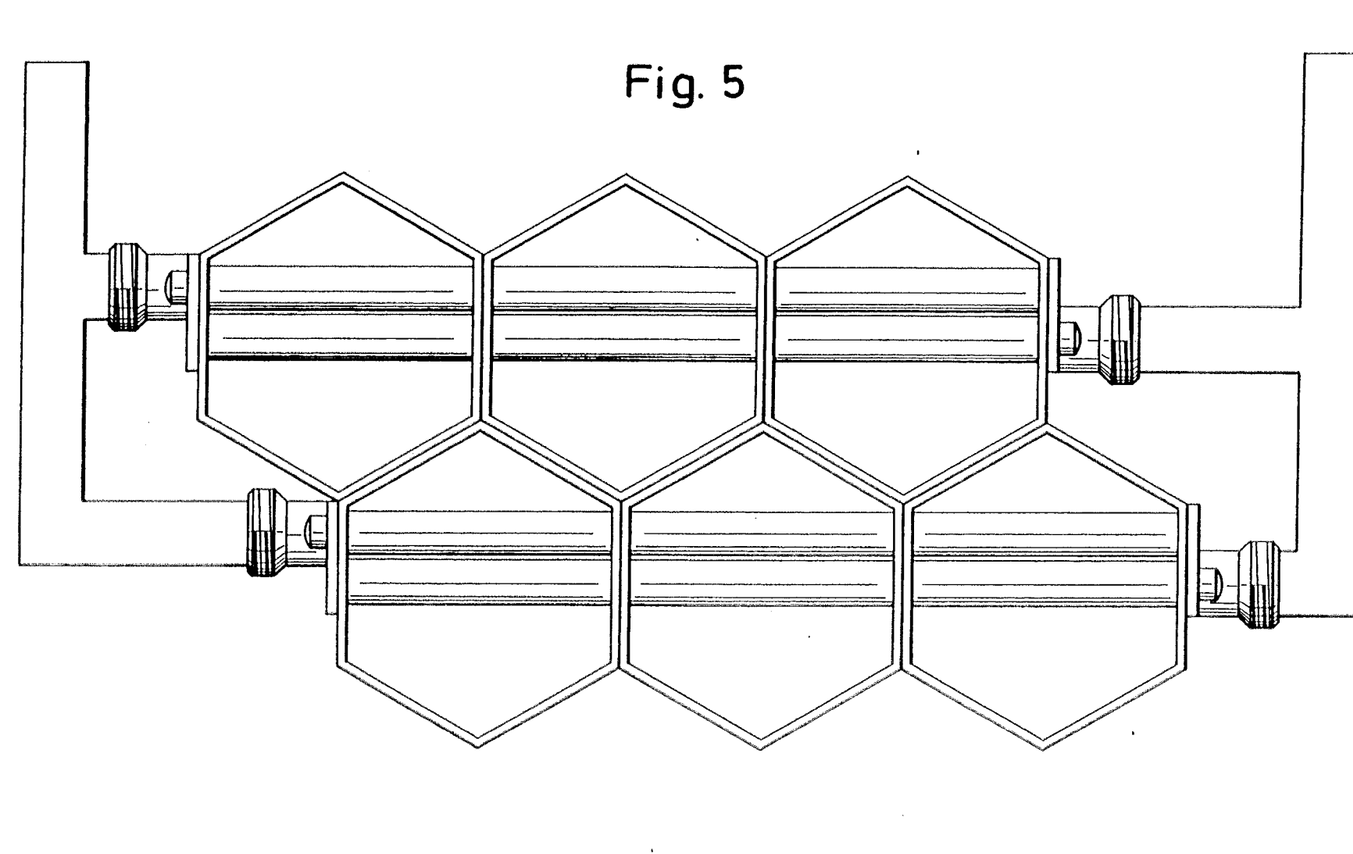
FIG. 5 is a plan view of a further possible arrangement of units in accordance with the present invention.

As mentioned above a square shape of the filter heads of each unit is preferred, however, a hexagonal shape can also be employed as shown in FIG. 5. This embodiment would have the advantage in a close packing of a multi-row assembly. The close packing arrangement not only has the advantage of saving space, the contact of respective rows imparts rigidity to the assembly.

Figure 3:
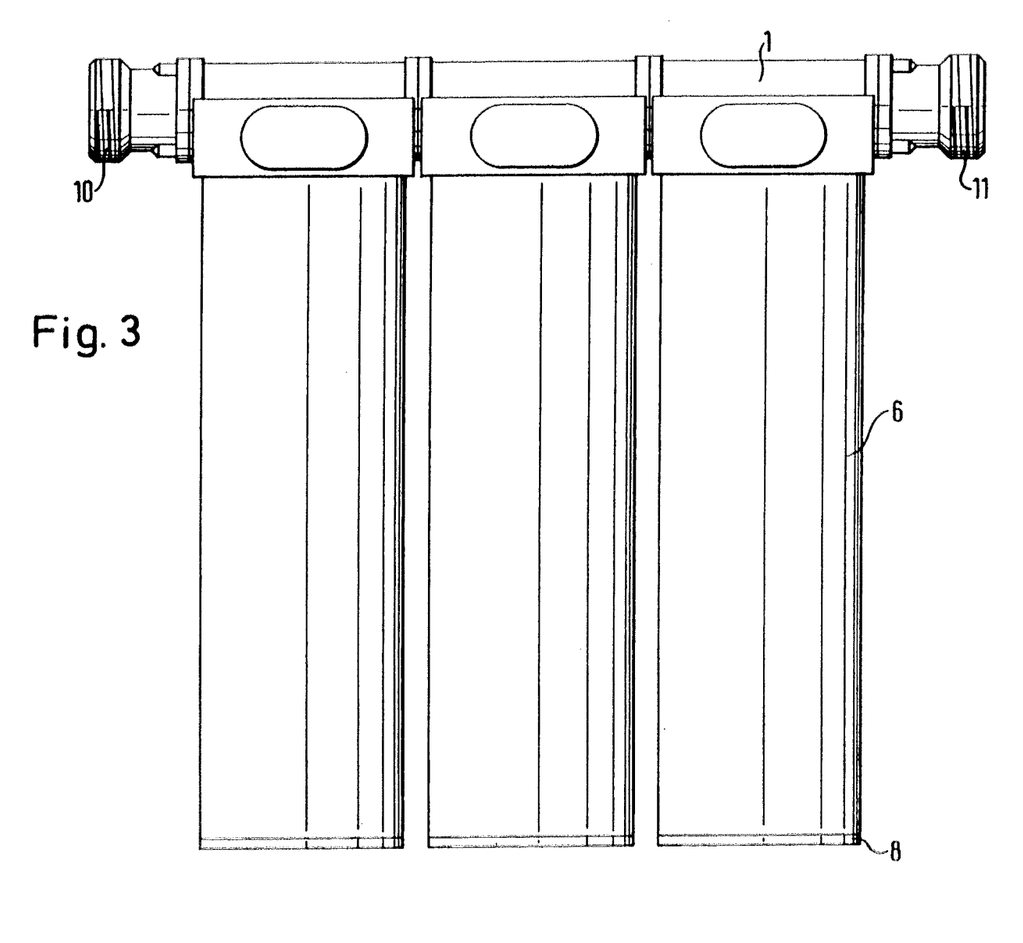
FIG. 3 is a side-view of the filter arrangement of FIG. 1.

In a further embodiment of the invention, the assembly comprises an inlet connector 10 and outlet connector 11 as shown in FIGS. 1 and 3. The inlet connector 10 is connected to a first mounting surface 25 of one filter head. The inlet connector 10 has an inlet passage communicating with the inlet opening 21 of the feed chamber 2 and is provided with a blanking cap 10a which fits over the inlet opening 31 of the discharge chamber 3 outlet channel and closes same.

Similarly the assembly is provided with an outlet connecter 11 connected to the opposing mounting surface 35 of a filter head located at the other end of the assembly, for example as shown in Figs. 1 and 3. The outlet connector comprises an outlet passage as well as a blanking cap 11a which doses and seals the outlet opening 22 of the feed chamber 2 on the down-stream side of the assembly.

Figure 11:
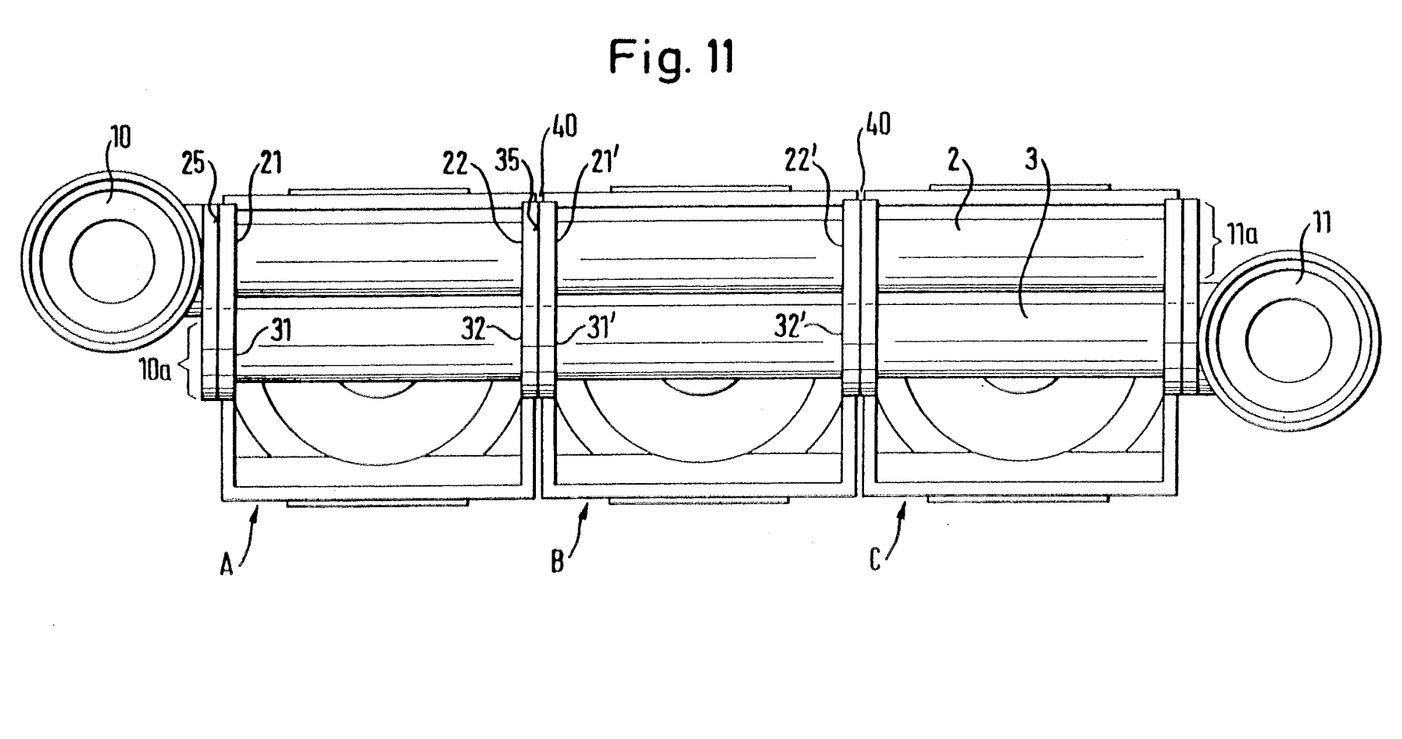
FIG. 11 shows an alternate embodiment of the filter assembly where the inlet and outlet connectors have an elbow form.
Figure 12:
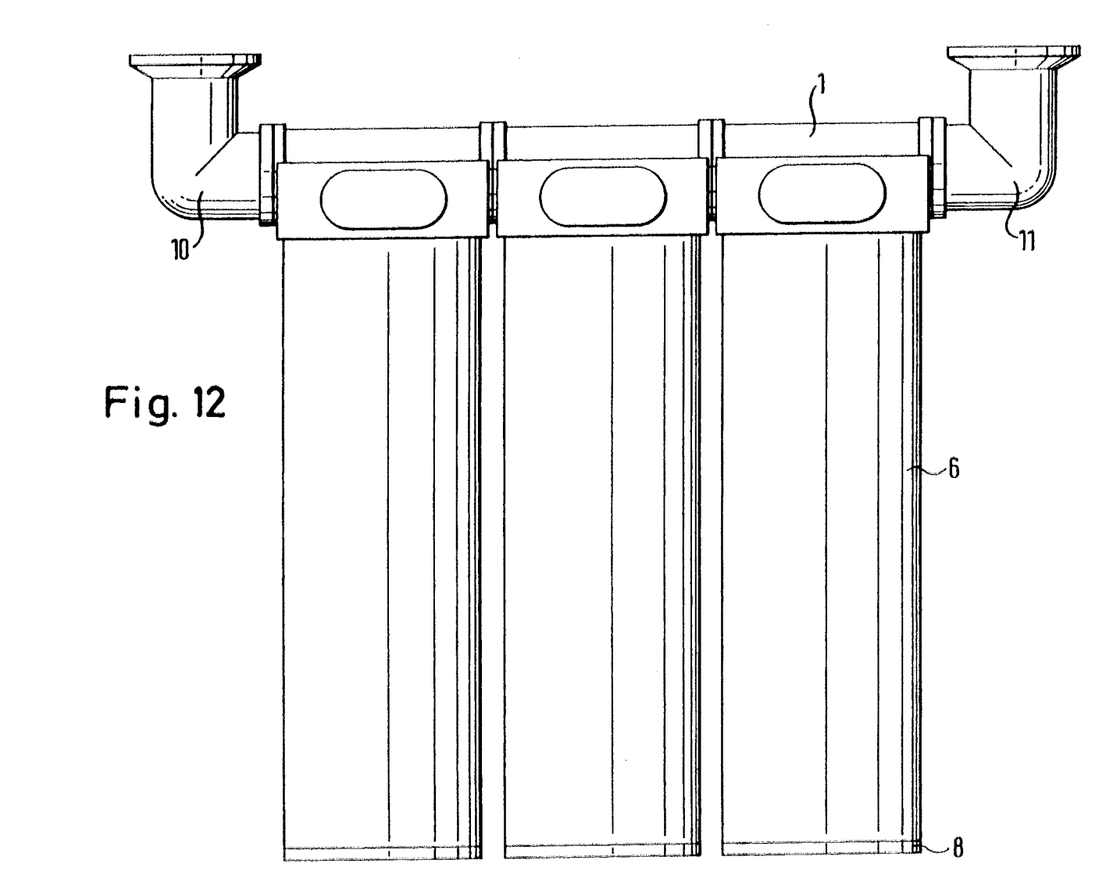
FIG. 12 shows a side view of the embodiment of FIG. 11.

As can be seen in the embodiment of FIG. 2, the channel cross-sections of the inlet and outlet openings are oval. The inlet and outlet connectors 10, 11 are preferably formed such that the end connecting to the mounting surfaces 25, 35 respectively have a cross-section which is the same, i.e. oval, as the inlet and outlet openings. The other end of the inlet passage of the inlet connector 10 preferably has a circular cross-section, which can be seen for example in FIG. 6. Likewise, the outer end of the outlet passage of the outlet connector also has a circular cross-section. This is also shown in FIG. 11 and 12 where the inlet and outlet connectors are additionally provided with a 90° elbow. The circular cross-section of the outer ends of the connectors guarantees ease of connection of the filter assembly to the remaining pipework.

The inlet and outlet connectors are preferably formed of plastic material. Particularly advantageous is the integral construction of the connectors with a blanking cap 10a. 10b. This construction reduces the number of parts needed in assembly and reduces the assembly time. In a further embodiment a non-return valve is placed in the inlet passage of the inlet connector and an anti-spill valve is provided in the outlet passage of the outlet connector. Thus, when changing and disposing of the filter assembly the influent contained in the filter system will not spill out.

A further advantage of the inlet and outlet connections is that they are of the same dimension and can therefore be formed using a common mold, for example in injection molding. The only difference in application is then that the inlet connector is provided with a non-return valve and the outlet connector with an anti-spill valve.

The inlet and outlet connectors can be joined to the respective filter heads in any suitable manner. The joining is preferably made by platen welding.

In accordance with the present invention, the filter units in an assembly can also be connected to provide a series flow connection. It is also possible to connect some filter units in parallel followed by a unit or units connected in series and combinations thereof. FIG. 4 shows an embodiment in which the first three filter units (A, B, C) are connected in parallel, while the following fourth (D) and fifth (E) units (in flow direction) are connected in series. The first and second mounting surfaces 25 and 35, respectively, of the first three units A, B, C are joined at the joints 40 in the manner discussed above in conjunction with FIGS. 1 and 2. This provides a parallel flow connection.

Filter unit D is rotated by 180° and a blanking plate 50 is provided in the joint between the filter units C and D. The blank is provided with a closed portion 52 and an open portion 51. As seen in FIG. 4, the open portion 51 of the blank 50 allows flow from the outlet opening 32 of the discharge chamber 3 into the feed chamber opening 31' of filter unit D. The closed portion 52 of the blank 50 closes the outlet opening 22 and prevents flow passage to the discharge chamber opening 21'. By reversing the orientation of the blank 50 at the outlet side of filter unit D, i.e. at its second mounting surface 35', the series connection is achieved. The outlet opening 22" is opened, i.e. communication is allowed to the feed chamber of the next filter unit E. At the same time, the outlet opening 32" is closed. Providing such intermediate blanks between each filter unit in an assembly row provides a complete series connection. As mentioned before, however, combined arrangements having portions connected in parallel and portions connected in series can be provided. This is particularly advantageous for applications when a particular capacity or a multi-stage system is desired.

A further embodiment of the claimed assembly comprises a plurality of parallel rows of filter units. The individual inlet connectors for each row can be replaced by one external manifold (not shown) to form a multi-row filter system. The inlet manifold then connects to the feed chambers 2 of the first filter head in each row while at the same time the manifold is provided with blanks 10 a for closing the inlet openings 31 of the discharge chambers 3 exposed at this upstream side of the filter heads.

Similarly an outlet manifold is provided in the multi-row filter system which connects to the outlet openings of the discharge chambers of the last filter head in each row. Here again the outlet manifold is provided with blanks to close the outlets of the feed chambers exposed on the mounting surfaces of the respective last filter heads in each row. These external manifolds allow one connection point to the user system, i.e. one connection point for inlet and outlet respectively. These external inlet and outlet manifolds can also be formed of plastic tubing so that in this embodiment too, the whole system can be formed as a completely disposable filter system.

As mentioned above, one embodiment of the filter unit provides that the first and second mounting surfaces 25, 35 be arranged on one side of the filter head. As shown in FIG. 7, the opening to the feed and discharge chambers can be located on the top side of the filter head, whereby the two mounting surfaces then become one single surface. In FIG. 7, the inlet opening 71 and the outlet opening 72 to the feed chamber are designated F. The inlet opening 81 and outlet opening 82 of the discharge chamber are designated D.

Figure 8:
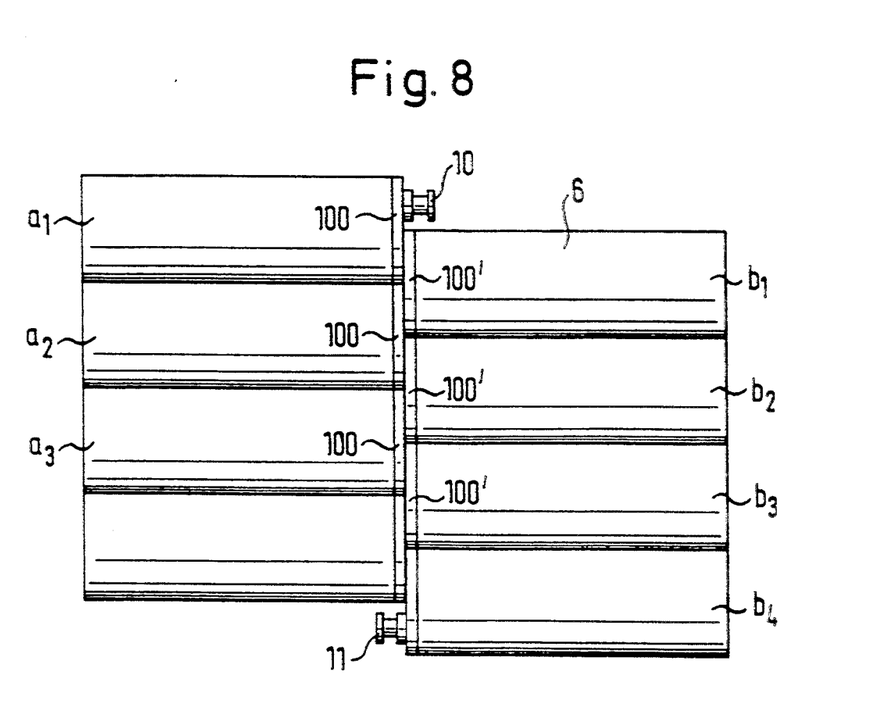
FIG. 8 shows an embodiment of the filter assembly, where the filter heads are those of FIG. 7.

A filter assembly can be constructed as shown in FIG. 8 making use of the filter head embodiment of FIG. 7. The filter units a on the left side of FIG. 8 are connected head to head to the filter units b. The first filter unit a has an inlet connector 10 allowing flow into the first inlet opening 71 of the feed chamber (see FIG. 7). The blanking portion of the inlet connector 10 closes off the inlet opening 81 of the discharge chamber. The outlet opening 72 of the feed chamber and the outlet opening 82 of the discharge chamber, i.e. the openings below the dividing line ZZ in FIG. 7, are connected face to face with the respective feed and discharge inlet openings of the next filter unit. This is the filter unit $b_1$ with the filter head 100' on the right-hand side of FIG. 8. The outlet openings 72, 82 for feed and discharge of the head 100' unit $b_1$ are then connected, again head to head with the inlet openings 71, 81 for feed and discharge of the next filter unit $a_2$. This sequence then continues and results in a parallel connection of the filter units a and b. The last filter unit $b_4$ then is provided with an outlet connector 11, whose blanking portion would close the last feed outlet opening 72.

Figure 9:
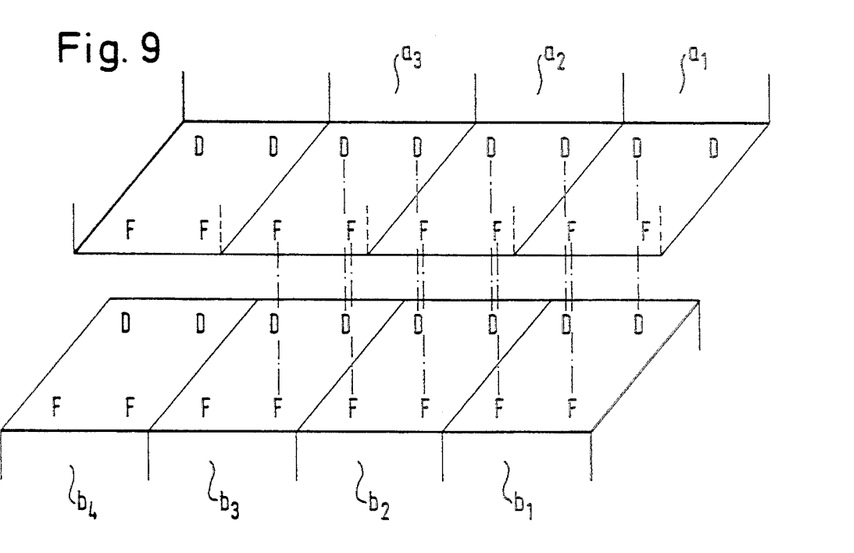
FIG. 9 illustrates an array of filter heads positioned to give a parallel flow connection.

The positioning of the openings to the feed F and discharge D chambers to provide a parallel connection is indicated schematically in FIG. 9. In the assembled condition, the mounting surfaces of the upper filter units A would be joined head to head to the top side mounting surfaces of the lower units B. The connecting lines indicate the respective openings which would communicate with one another.

A further variation of the embodiment of FIG. 8 can be achieved with the use of blanking plates 50 of the type shown in FIG. 4. When all of the filter elements b as on the right side of FIG. 8 are rotated by 180° and the blanking procedure is employed as discussed in conjunction with FIG. 4, a series connection can be established.

Figure 10:
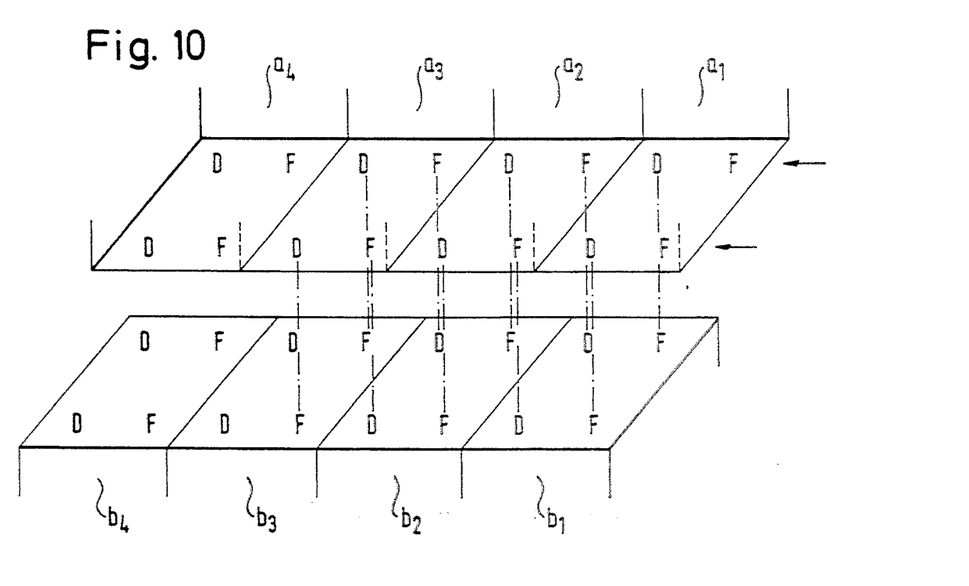
FIG. 10 illustrates an array of filter heads positioned to give a series flow connection.

A further and more convenient method of establishing a series flow connection is shown by the arrangement in FIG. 10. Again in the operational condition, the mounting surfaces of the upper filter units a would be connected intimately with the mounting surfaces of the lower filter units b. The difference between the series connection of FIG. 10 and the parallel connection of FIG. 9 is that in the series connection, each of the elements is rotated by 90°. It may be noted that in the as embodiment of FIG. 10, both of the openings in each head surface designated with F are inlet openings, while both openings indicated as D are outlet openings. For example in FIG. 10 the fluid can enter the two feed openings, indicated by the two arrows on the upper right hand part of the figure. From here, the fluid must flow through the filter element (no bypass possible) to the discharge openings, both of which discharge to the next filter unit, namely to the next two feed openings. In this manner a series connection is established.

Figure 6:
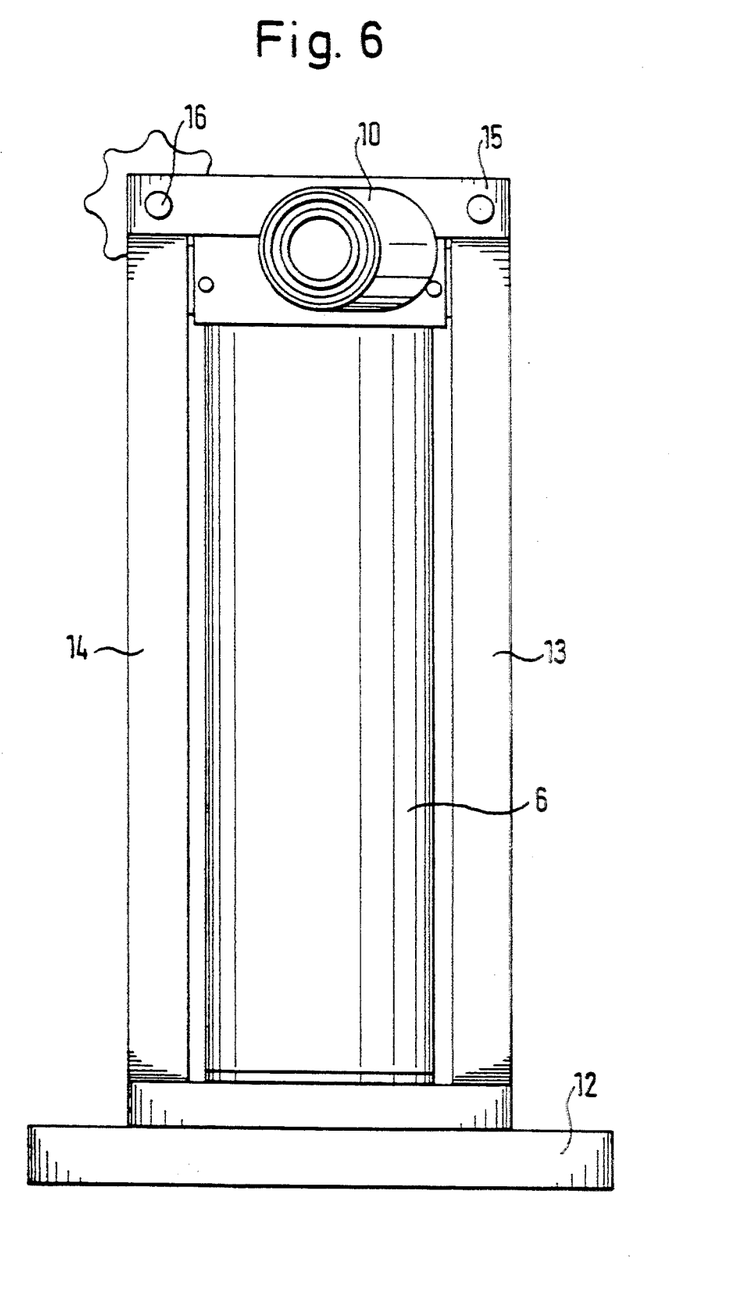
FIG. 6 shows an embodiment in which the filter assembly is located in a mounting frame.

To secure the filter system in a vertical operating position, a mounting frame can be provided in a further embodiment of the invention as shown in FIG. 6. The frame consists of a base plate 12, vertical tie bars 13 and 14, a hinged top plate 15 and a screw bolt lock 16. The use of a simple bolt lock with a hand knob eliminates the need for tools to be used when assembling and disassembling the filter assembly. The frame also provides additional support to the filter system in an axial direction when the system is operating under pressure.

In a further embodiment (not shown) a cylindrical metal sheath can be fitted around the entire length of each plastic housing or tube. This embodiment is particularly advantageous when higher mechanical forces arise in the system. The metal sheath provides radial strength and gives additional support to the plastic tube.

The cylindrical sheath can be manufactured from light gauge metal sheet which can be discarded upon disposal of the filter system. In another embodiment, the sheath can be formed as a thick wall split cylinder which is reusable. Alternatively, the support could take the form of a series of separate cylindrical clamps, which are placed around the tube 6 at intervals. Such clamps would normally be disposed of with in the case of the filter module.

I claim:

1. A modular filter assembly comprising a plurality of filter units, each filter unit having a plastic filter head including a feed chamber and a discharge chamber, a filter element, and means, including a casing mounted on the plastic filter head and surrounding the filter element, for permitting fluid flow between the feed chamber and the discharge chamber via the filter element, wherein the feed chamber has an inlet opening and an outlet opening and the discharge chamber has an inlet opening and an outlet opening and wherein adjacent ones of said filter units are connected to one another by welding respective plastic filter heads to form welded joints, the outlet opening of the feed chamber or the discharge chamber of one filter unit communicating with the inlet opening of the feed chamber or the discharge chamber of an adjacent filter unit through said welded joint, thereby forming a parallel flow or a serial flow connection between adjacent filter units.

2. Filter assembly of claim 1, wherein the inlet openings of said feed and discharge chambers open to a first mounting surface on the filter head and the outlet openings of said feed and discharge chambers open to a second mounting surface on the plastic filter head, said mounting surfaces of adjacent plastic filter heads being welded for form welded joints.

3. Filter assembly of claim 2, wherein each plastic filter head has first and second opposing sides and the first and second mounting surfaces are arranged on the first and second opposing sides of each plastic filter head, respectively, the plurality of filter units being arranged in a row and connected by successively welding the second mounting surface of a respective plastic filter head to the first mounting surface of the next adjacent plastic filter head.

4. Filter assembly of claim 2, wherein the outlet opening of each feed chamber is joined to the inlet opening of each following feed chamber and the outlet opening each discharge chamber is joined to the inlet opening of each following discharge chamber to thereby form a parallel-type flow connection of the filter units.

5. Filter assembly of claim 3, comprising a plurality of parallel rows and an inlet manifold connected to the first mounting surface of the initial filter head in each row and an outlet manifold connected to the second mounting surface of the last filter head in each row.

6. Filter assembly of claim 5, wherein said inlet manifold is provided with blanks for closing the inlet openings of the discharge chamber of said initial filter heads in each row, and wherein said outlet manifold is provided with blanks for closing the outlet openings of the feed chambers of the said last filter heads in each row.

7. Filter assembly of claim 3, further comprising a plastic inlet connector which is welded to the first mounting surface of an initial filter head in said row, said inlet connector having an inlet passage communicating with the inlet opening of the feed chamber of the initial filter unit in the row, and wherein a blanking cap is welded to the first mounting surface at the inlet opening of the discharge chamber of the initial filter unit to close the discharge chamber.

8. Filter assembly of claim 7 wherein the inlet connector and the blanking cap for the discharge chamber is formed as an integral construction of plastic material.

9. Filter assembly or claim 7, wherein an end of the inlet passage of the inlet connector adjacent said inlet opening of the feed chamber has the same gross section as the inlet opening of the feed chamber while the cross section of an opposite end of the inlet passage of said inlet connector is circular.

10. Filter assembly of claim 9 wherein the inlet connector is formed with a 90° elbow in the inlet passage.

11. Filter assembly of claim 3, further comprising a plastic outlet connector which is welded to the second mounting surface of the last filter head in said row, said outlet connector having an outlet passage communicating with the outlet opening of the discharge chamber of the last filter unit in the row, and wherein a blanking cap is welded to the second mounting surface at the outlet opening of the feed chamber of the last filter unit to close the feed chamber.

12. Filter assembly of claim 11, wherein an end of the outlet passage of the outlet connector adjacent said outlet opening of the discharge chamber has the same cross section as the outlet opening of the discharge chamber, while the cross section of an opposite end of the outlet passage of said outlet connector is circular.

13. Filter assembly of claim 12 wherein the outlet connector is formed with a 90° elbow in the outlet passage.

14. Filter assembly of claim 11 wherein the outlet connector and the blanking cap for the feed chamber are formed as an integral construction of plastic material.

15. Filter assembly of claim 1, wherein the filter casing of each of said plurality of filter units comprises plastic material and is welded to each plastic filter head (1) respectively to form a welded joint (7).

16. Filter assembly of claim 1, wherein the joints between adjacent surfaces of the filter heads are formed by platen welding or by non-contact melt bonding.

17. The modular filter assembly of claim 1 wherein the welded joint includes a plastic blank having an open portion and a closed portion, said plastic blank being arranged to allow or block flow between the inlet and outlet openings of the feed and discharge chambers of the filter units.

18. The modular filter assembly of claim 1 including first and second blanks, each blank having an open portion and a closed portion, wherein the plurality of filter units include first, second, and third filter units coupled through said welded joints, each filter element having first and second mounting surfaces, wherein the first blank is disposed in the welded joint between the second mounting surface of the first filter unit and the first mounting surface of the second filter unit and is arranged to allow flow between the discharge chamber of the first filter unit and the feed chamber of the second filter unit and block flow between the feed chamber of the first filter unit and the discharge chamber of the second filter unit and wherein the second blank is disposed in the welded joint between the second mounting surface of the second filter unit and the first mounting surface of the third filter unit and is arranged to allow flow between the discharge chamber of the second filter unit and the feed chamber of the third filter unit and block flow between the feed chamber of the second filter unit and the discharge chamber of the third filter unit thereby establishing a series-type flow connection of the first, second, and third filter units.

19. The modular filter assembly of claim 1 wherein the inlet opening and outlet opening for the feed chamber are located on first and second sides of the plastic filter head, respectively.

20. The modular filter assembly of claim 1 wherein the inlet opening and outlet opening for the discharge chamber are located on first and second sides of the plastic filter head, respectively.

* * * * *